Oct. 14, 1941.  A. L. STONE  2,259,232
WELL PIPE JOINT
Filed Aug. 17, 1938  5 Sheets-Sheet 1
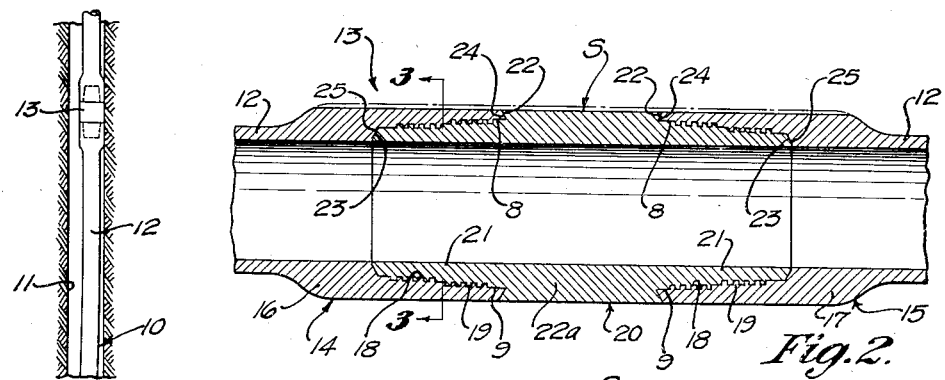
Fig. 2.
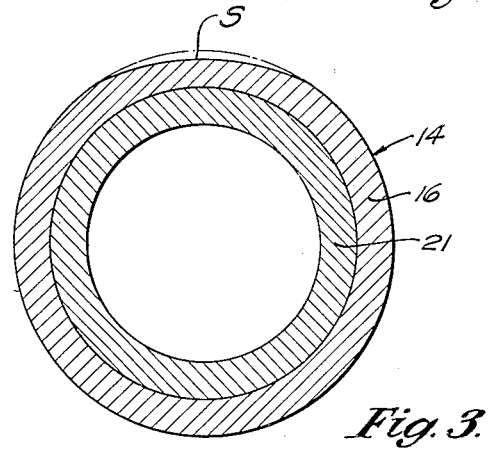
Fig. 3.
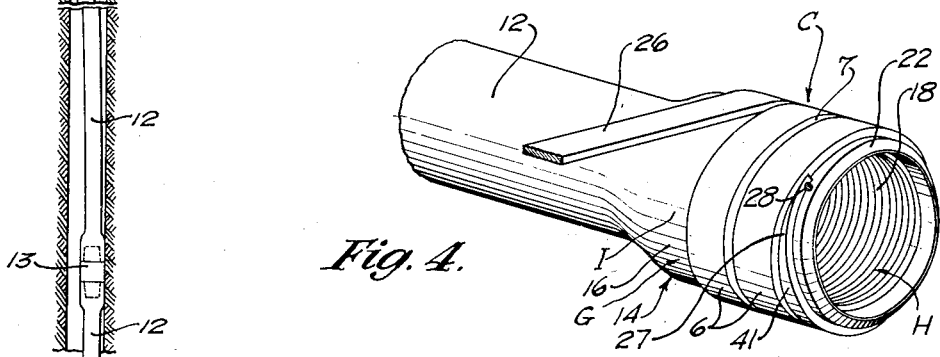
Fig. 1.
Fig. 4.
Inventor
Albert L. Stone.
Attorney.

Oct. 14, 1941.   A. L. STONE   2,259,232
WELL PIPE JOINT
Filed Aug. 17, 1938   5 Sheets-Sheet 2

Inventor
Albert L. Stone

Attorney.

Oct. 14, 1941.  A. L. STONE  2,259,232
WELL PIPE JOINT
Filed Aug. 17, 1938  5 Sheets-Sheet 3
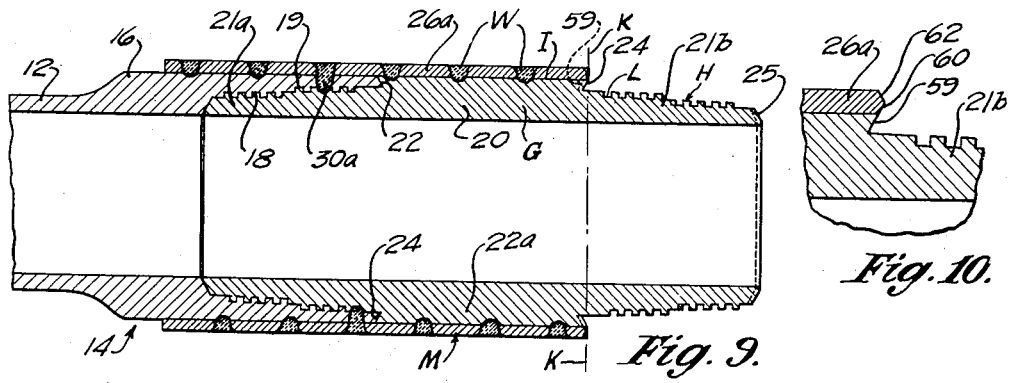
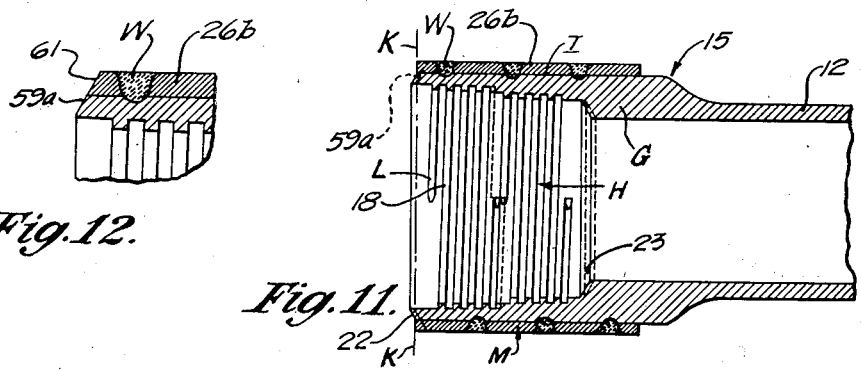
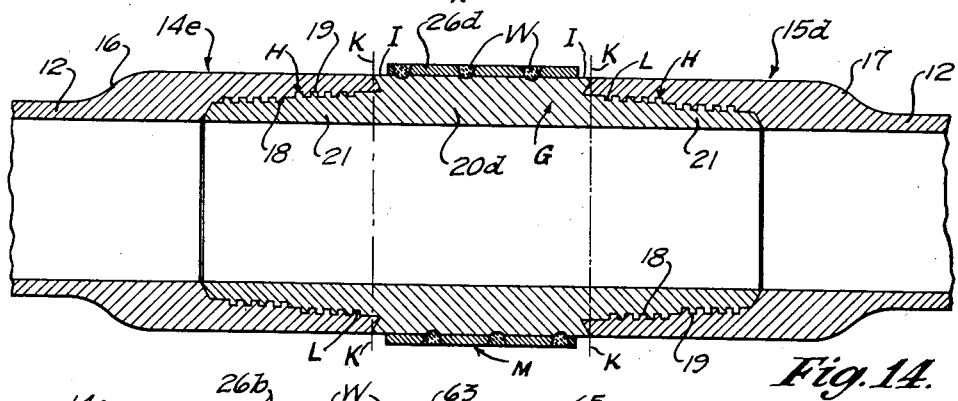
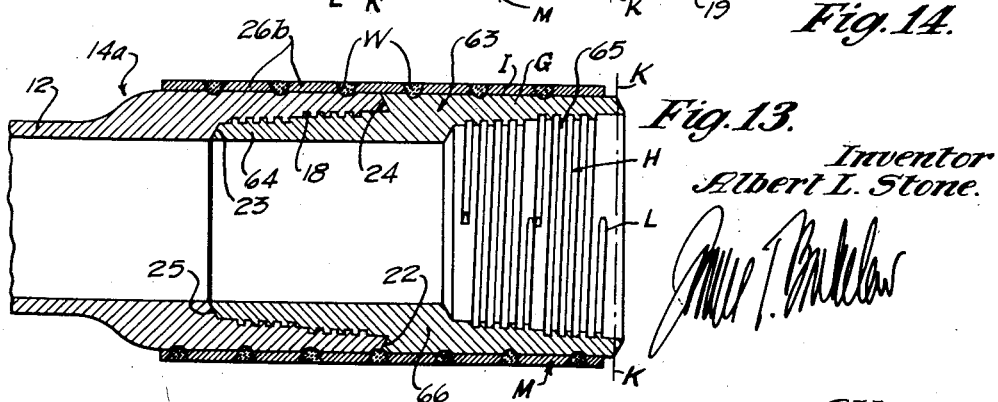
Inventor
Albert L. Stone.
Attorney.

Oct. 14, 1941.  A. L. STONE  2,259,232
WELL PIPE JOINT
Filed Aug. 17, 1938  5 Sheets-Sheet 4
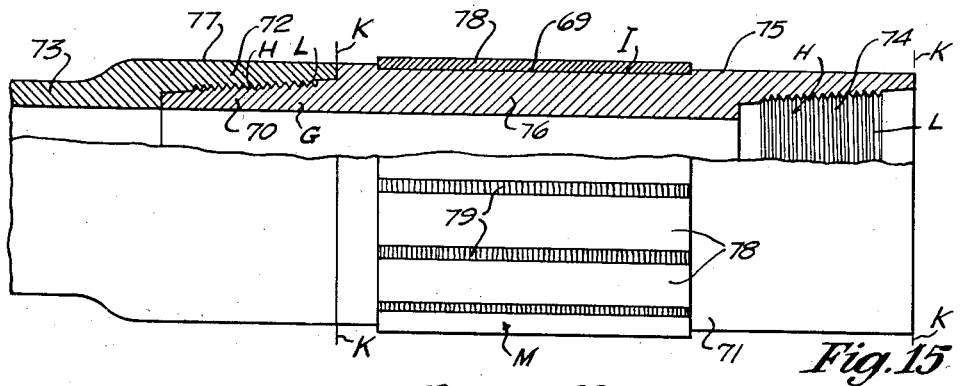
Fig.15
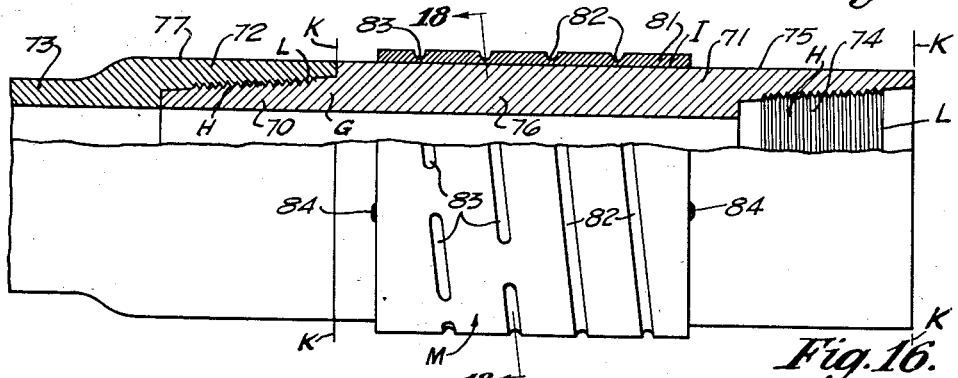
Fig.16.
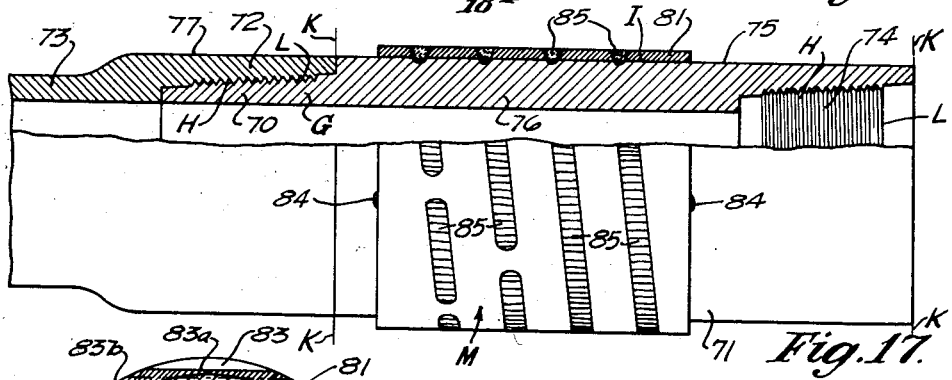
Fig.17.
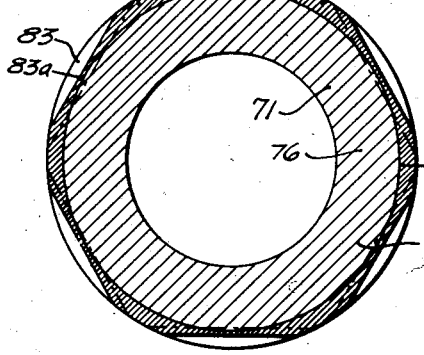
Fig.18.
Inventor
Albert L. Stone.
Attorney.

Patented Oct. 14, 1941

2,259,232

UNITED STATES PATENT OFFICE 2,259,232

WELL PIPE JOINT

Albert L. Stone, Palos Verdes Estates, Calif., assignor to Hydril Company, Los Angeles, Calif., a corporation of California Application August 17, 1938, Serial No. 225,362

5 Claims. (Cl. 308—4)

The present application is a continuation-in-part of my application on Protection and repair of drill pipe, joints, subs and the like, filed December 27, 1937, Serial No. 181,975.

The invention relates generally to protected or reconditioned well-pipe joints and has among its general objects greatly to increase the useful life of well-pipes and their joints as well as greatly to minimize the risk of accidental breakage or "twist-offs" which are so costly and hazardous. It is also among the objects of the invention to provide a structure of protection and repair which is economical and simple of application, affords a maximum of protection and of wearing capacity and in no wise harmfully distorts or weakens the part to which it is applied, but on the contrary strengthens it.

In order better to bring out the features of invention I will confine the discussion to well-pipe of a particular nature with which the invention may be embodied with very particular advantage, but it is to be distinctly understood that the invention, considered in its broader aspects, is not limited to this illustrative embodiment.

I have chosen to illustrate the invention in connection with a drilling string made up of lengths of drill pipe and suitable connecting members for the interconnection of the pipe-lengths, together with subs or other joint members for the connection of various tools with the drilling string. I have further particularized in the major part of my showing (but, again, without intending to limit the invention to this particularization) by the illustration and description of a drilling string made up of pipe lengths which have internally threaded boxes formed in the integral, up-set ends thereof, with double-pin tool joints threadably connecting the boxes of adjacent pipe-lengths. Most of the illustrated threads are of the two-step, quick detachable type which, in order to preserve other necessary dimensional relationships, inherently result in relatively thin walls at the extreme ends of the boxes—and the thinness of those walls materially limits the radial extent of the end shoulders which are depended upon, under certain conditions of joint make-up, to cooperate with opposed shoulders of the pin member to take certain loads and preserve fluid-tightness.

Since the upset boxes protrude radially beyond the outer periphery of the pipe, it is these members which, with the tool joints, take the brunt of the wear during drilling operations. Yet these exposed boxes are least adapted to stand the wear, for as they are worn down the wall thickness is decreased at the critical (threaded) part of the joint, which condition invites serious consequences, as is readily understood. The boxes may be worn relatively thin long before the major portion of the associated pipe length is damaged to any appreciable extent—yet, in the absence of preventative or curative means, the entire pipe must be discarded along with its integral boxes. The economic loss is self-evident and is one which, prior to the present invention, tended to discourage the purchase and use of this type of pipe in spite of its conceded superiority in other directions.

How I have counteracted this effect with the result that this type of pipe has been brought back into favor, may be discussed to better advantage in the detailed specification, but it is to be remembered that the invention may be applied to and is likewise of great advantage in the protection and reconditioning of other types of well-pipe joints, though possibly not to the same extent as in the illustrated and above mentioned situation.

Reference will be had to the accompanying drawings in which:

Fig. 1 shows schematically a length of drilling string within a well bore, illustrating a condition which brings about a particular type of wear on the pipe joint;

Fig. 2 is a longitudinal medial section through a worn pipe-joint;

Fig. 3 is an enlarged section on line 3—3 of Fig. 2;

Fig. 4 is a diagrammatic perspective illustrating one mode of application of the wear-resistant element;

Fig. 9 shows a variational method of reconditioning a joint;

Fig. 10 is an enlarged fragmentary detail showing the reconditioning of the tool joint shoulder;

Fig. 11 illustrates a step in the method of reconditioning a box where the end shoulder is to be re-formed;

Fig. 12 is a fragmentary detail showing the reformed end shoulder of the box in Fig. 11;

Fig. 13 shows the reconditioning of a box by the utilization of a breaking sub;

Fig. 14 illustrates the method of protecting the box members of a joint by building up the tool joint thereof;

Fig. 15 shows a method of protecting the box of a joint by applying wear-resistant elements to a sub adjacent thereto;

Figs. 16, 17 and 18 show different steps in applying a box-protecting member to a sub in a manner somewhat different from that shown in Fig. 15.

Figure 5:
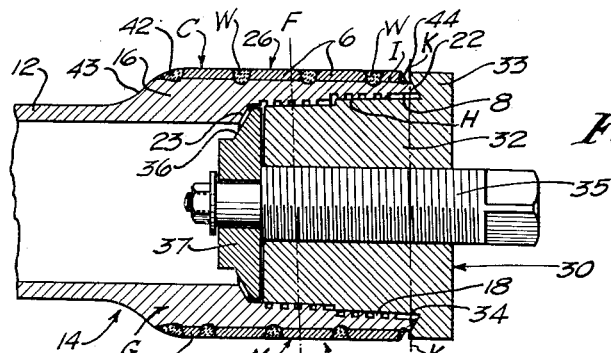
Fig. 5 is a section illustrating a reconditioned box, and an appliance which may be used in connection with the reconditioning operation.

In Fig. 1 I have shown a drilling string 10 within a well bore 11, the string being made up of pipe lengths 12 and joints 13. Referring to Fig. 2, it will be seen that the illustrated joints are of the general type described in connection with Figs. 1 and 2 of Patent No. 1,932,427 issued to Frederick Stone on Well pipe joint, October 31, 1933, except that the patent shows the box end of the joint as internally upset, whereas the instant showing is that of an externally upset box. However, in both instances the box portion of the joint is integral with a pipe length. In the present case, the opposed boxes 14 and 15 are similar and are externally upset at 16 and 17, respectively, the upsets being provided with internal, two-step threads 18 which are adapted to mate with the corresponding external two-step thread 19 on the double-pin tool joint 20 whose similar pin portions 21 are of less diameter than its central, body portion 22a. Each box is provided with an external conical shoulder 22 and an internal conical shoulder 23 which shoulders are, respectively, opposed and complementary to external conical shoulder 24 and internal conical shoulder 25 on the corresponding end of tool joint 20.

There is thus provided a quick make-and-break joint between adjacent pipe lengths 12, the utility of which is well recognized by those familiar with the art. In the type of joint here shown, the spacing between internal and external shoulders of each member is very accurately gauged and their relation to the threads is accurately predetermined so that in making up the joint there will be predetermined sequential seating of the shoulders in the manner and for the purposes set forth in the aforementioned patent. There exists a smooth, unthreaded extent 8 at the extreme end of the box which takes the complementary portion 9 of the pin, but the annular portion of the box which defines this extent is not exposed to serious stresses.

It will, of course, be understood that the above described showing of this particular type of make-and-break joint is for illustrative purposes only and is in no way to be considered as inferring that the invention may not be applied with great advantage to other types of joints. It will be noted, however, that the illustrated type of box inherently has a relatively thin wall, particularly near its outer end, and that relatively slight wear of that wall will not only reduce the radial extent of shoulders 22 and 24, but will also reduce the thickness of the stock backing up the threads, thus weakening the threaded connection between box and pin, which, of course, is a critical part of the joint.

Since the boxes and tool joint protrude beyond the outer surface of the pipe, they are subjected to very considerable wear and deterioration due to drill pipe rotation and localized pressure contact with the rough wall of the hole or with the casing in the presence of highly abrasive materials. The rotary mud carrying the cuttings from the tool below, flows up around the drill pipe and thus has the effect of eroding and cutting away projecting members such as the joints; while at points where the drill pipe may locally contact the wall or casing under high pressure, abrasive wear of the joints is apt to be very rapid, often resulting in early deterioration and very possible failure, particularly near the outer ends of the boxes.

While such wear may occur relatively evenly about the entire periphery of the joint, it is much more apt to be localized on a particular side, and I have schematically illustrated in Fig. 1 a situation wherein this localized wear occurs and have assumed in the later discussion that the reconditioning is to care for this particular circumstance, though it will be realized that the method is just as effective where the wear is of a nature other than that here illustrated.

While the major portion of the drilling string is in tension, it is found that various portions thereof may be in localized longitudinal compression, with a resulting tendency to bow the string somewhat as illustrated in Fig. 1. Throughout these sections the drill stem oscillates and the protuberant joints are consequently rapidly worn away on one side, the wear on one joint usually being approximately 180° removed from the point of wear on the next worn joint.

The problem thus becomes one of either protecting the relatively thin box against excessive wear or, after wear has occurred, to recondition the joint and restore it to its original condition before the wear results in failure of the joint or dangerously closely approaches such a condition. Initial protection of the box may be accomplished by building up the diameter of the mating tool joint so that it receives the wear instead of the box, while the reconditioning may involve building up of either the box or tool joint, or both, to approximately their original outside diameters or to even greater than original diameters. The method I employ to accomplish this is one which has no harmful effects on the original body of material and has been found to prolong the useful life of a drilling string to a decidedly marked degree.

Characteristically, the present invention accomplishes the desired ends by the application of the joint body of a protective sheath made up of an element or elements of selected wear and abrasive resistant material and then to integrate that sheath with the underlying stock by welding. It is also characteristic of the invention that the major mass of the completed sheathing ring or annulus is composed of a material not deposited by welding or similar process requiring excessive or overall heating of the joint for application. It is thus possible to select for this mass a material which is characterized by the superiority of its hardness, toughness or other wear and abrasive resisting qualities.

As I will point out, the sheath may, for instance, be made up of lengths or strips of wear resistant material laid in parallelism or edge-to-edge relationship to form, with the weld material, a composite ring-shaped protector. Other types of sheaths will also be described.

The lengths spoken of may be of separate strips or may be convolutions of a continuous strip, the latter being preferable, and it is characteristic that the applied wear-resistant element, whether or not of the strip type, are welded to the joint in a manner not necessitating heating any substantial portion of the joint mass to high temperature. As will be described, the lines of weld are established as being such that the localized heating of the joint-part during the welding operation does not set up such stresses and strains in the joint-material as might otherwise coincide with the normal planes of fracture and thus tend to create overly weakened zones or planes of fracture.

Figure 8:
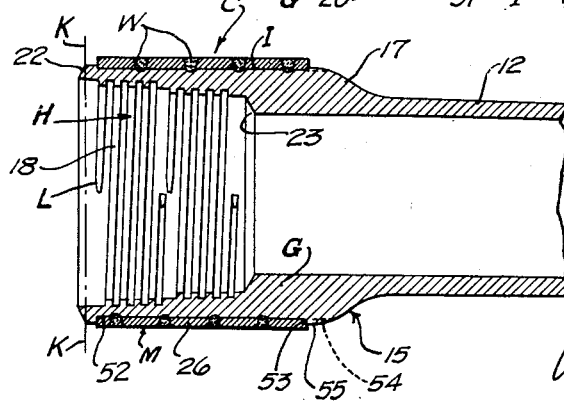
Fig. 8 is a section through a reconditioned box showing a somewhat different method of preparing the worn box member for the reception of the wear-resistant members.

In Figs. 2 and 3 it is indicated that the joint parts have been locally worn at S, the original thickness of the joint walls at these points being indicated by dot-and-dash lines. It will be assumed that the reconditioning of this joint calls for building up both the boxes and the body portion 22a of tool joint 20. First, we will consider the reconditioning of box 14. Preferably, the box is first externally turned down on its high side so that its outer peripheral face will be approximately concentric with the periphery of pipe-portion 12. Strip 26 of wear and abrasive resistant material, for instance chrome-molybdenum steel S. A. E. 4140, may be preliminarily heated to make it more easily bendable and formable, or it may be bent and formed cold, and then by the use of any suitable apparatus the strip, while being longitudinally tensed, is wound in spiral formation about the pipe as illustrated in Fig. 8. The spiral sheath C, as thus formed, may be closed or be more or less open, as will appear, though in this figure and in Fig. 5 the spiral is open, the spaces 7 between the coils or convolutions 6 being approximately of a width corresponding to the thickness of strip 26. The starting end 27 of the coil may be clamped or otherwise secured to the box, for instance by tack-welding 28, as may also be the tail end 29 of the strip. If the strip has been preheated and tensed as it is being wound, it will, upon cooling, having shrink-fit engagement with the box throughout their extent of contact, this being a desirable condition for obvious reasons. The strip is here shown as of rectangular cross-section and is chosen to be of a thickness which will restore the box to approximately its original outside diameter or, if desired, to an oversize outside diameter. Strip 26 is now integrated with box 14 and likewise the coils of the spiral are integrated one with the other by filling the spaces between the coils with weld material W which is preferably applied so that it penetrates the body of box 14 to an appreciable depth. Preferably, the chosen weld material has wear-resisting qualities substantially similar to those of strips 26, but upon occasion I find it desirable to use weld material of a harder nature, such as high manganese steel, which gives the composite sheath localized portions of extremely high wear-resistant qualities without the detrimental results which might follow if the entire sheath were made of this relatively brittle material.

Joints of the type I have described are necessarily very accurately machined and any deformation of the box or box thread tends to destroy this necessary accuracy. Such deformation or warping is liable to occur during the welding operation due to the localized application of heat, particularly since that application may not be even. Therefore, I prefer to employ a mandrel which is snugly fitted within the box prior to the welding operation, the mandrel thus tending to preserve the "roundness" and, generally, the original configuration and condition of the box and threads. The mandrel may be of any suitable type, for instance it may be a plug such as is indicated at 30 in Fig. 5 or it may be an ordinary tool joint 31, as indicated in Fig. 6.

Plug 30 consists of a cylindrical body portion 32 which is adapted snugly to fit the inner peripheral faces of the box threads and having a flange 33 which is undercut at 34 to take shoulder 22, the portion fitting the box threads preventing inward radial movement of the box and flange 33 preventing radial expansion of the free end of the box. The plug may be pressed home in any desired manner which will not mutilate the threads, the central jack-screw 35 being backed out to insure that the conical face 36 on pressure disk 37, carried by that jack-screw, does not engage box-shoulder 23. After the weld is completed and the box has cooled sufficiently, the plug is removed by operating jack-screw 35 in a manner to engage face 36 with shoulder 23, whereupon continued operation of the jack-screw backs the plug out of the box bore.

Tool joint 31 may be used as a mandrel in the same manner as is plug 30, it both preventing inward radial distortion of the box, proper, and preserving the original condition of the box thread, while its overhanging shoulder 31a prevents outward radial displacement of the free end of the box. In some instances the heat of welding may be sufficient to raise excessively the temperature of the box or the form-preserving mandrel, in the latter case the mandrel expanding excessively. Under such circumstances, I prefer to introduce a cooling medium within the mandrel and thus, in effect, within the box and the adjacent pipe length. This may be done in any suitable manner and any suitable cooling medium such as air, water or steam may be utilized, said medium preferably being circulated through mandrel bore 38.

Figure 6:
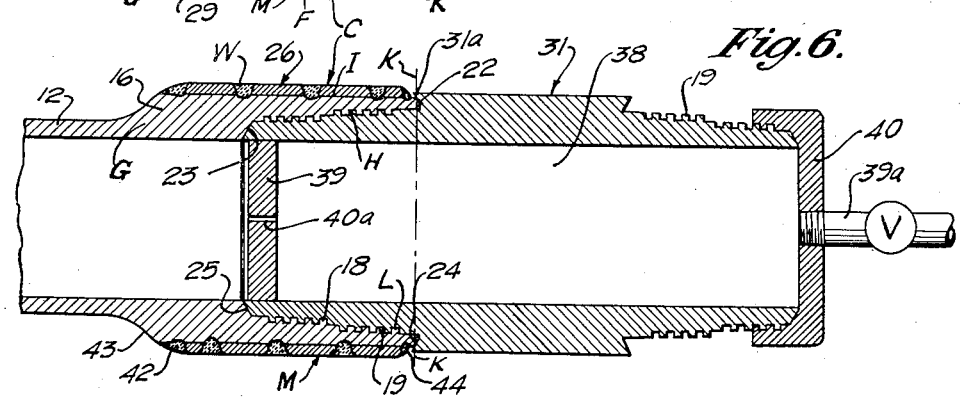
Fig. 6 is a section showing another appliance which may be used in the reconditioning operation.

In Fig. 6 I show the valved fitting 39a connected with any suitable source (not shown) of cooling medium and opening through cap 40 to bore 38. At the opposite end of mandrel 31 is a plug 39 having a relatively small outlet bore 40a which will allow the cooling medium slowly to escape from bore 38 into the bore of pipe 12. I prefer to utilize steam as a cooling medium since it may be supplied in a condition of proper mistification and the differential between its temperature and that of the heated metal is not so great that it tends to cause dangerous cracking of the metal during the welding operation, as is sometimes the case where the temperature differential is too great.

When the welding operation is complete, the cooling medium relatively rapidly cools the mandrel, the consequent contraction of which renders it readily withdrawable.

If desired, the extremities of strip 26 may be tapered as at 41 (Fig. 4) in order to present square, finished ends at the extremities of the sheath, and, if desired a shoulder 42 may be built up of weld material adjacent the innermost end of spiral C and merging into the original curve 43 of the upset, and there may be an end-weld 44 provided about the outermost end of the spiral.

Also, if desired, a finishing cut may be taken along the extent of the welded sheath to give a final smooth finish to the outer periphery thereof. In this connection, in some instances it is preferable that instead of originally turning down the eccentrically worn box, the sheath may be applied directly to the worn box, while finishing cuts after the sheath is fully applied and welded, are depended upon for bringing the outer periphery of the built-up box into concentricity with pipe portion 12.

As a variational method of application, strip 26 may be pre-formed as a spiral of suitable diameter to be slipped over the end of box 14. Its pre-formed internal diameter may be slightly smaller than the external box diameter and then either forced into place so as to have a tight peripheral grip, or expanded by the application of heat and then allowed to take a shrink-fit on the box. The welding or integrating operation will be the same as that described previously.

The normal fracture planes of the joint are approximately at right angles to the joint axis and in the case of the internally threaded portion of the box, said planes (for instance, see plane F in Fig. 5) follow the roots of the threads and hence their angle with respect to the joint axis may be considered as appropriately represented by the helix angle of the thread. It will be noted that the helix angle of the coiled strip 26 does not coincide with the helix angle of the thread, and accordingly the line of weld not only avoids a path directly around the box but also departs from the helix angle of the thread and hence from the normal planes of fracture. Thus the welding operation, which involves localized heating of the box, rather than further weakening the box at the normal planes of fracture, builds up material in a line crossing such planes and thus acts as added reinforcement for these relatively weak zones. By winding spiral C left-handedly where the box threads are right handed, as illustrated (or vice versa) the degree of departure of the lines of weld from the planes of fracture is increased, a condition which is of obvious advantage. In this connection it is to be noted that end-welds 42 and 44, when used, run directly around the pipe, but these still do not coincide with the normal fracture planes of the box, for these welds are on portions of the box where there is no underlying thread, weld 42 being on a very thick portion of the box and weld 44 being at a point where there are no appreciable tensile strains.

It is also to be noted that the described line of weld has the effect of integrating the sheath and box at different points longitudinally thereof and circumferentially thereabout, so, while the localized welding heat has been applied to but a relatively small area of the box (an area approximately equal to that of the weld-line) with consequent minimum weakening effect, the sheath is integrated with the box at spaced points which effectively resist the tendency to separate or tear apart the box and sheath when the reconditioned joint is subsequently placed in a drilling string and exposed to the torque and longitudinal stresses and strains incident to make-up and drilling operations. Further, with the described disposition of the weld line, the load (either tension or compression) on the weld is relatively light.

With the sheath and box integrated in this manner, that is, at different points longitudinally of and circumferentially about the box, subsequent wearing through of the sheath on one side thereof does not destroy or weaken the attachment between the box and coils on the other side, and hence the sheath-parts on that other side are not apt to be torn loose and dropped in the hole.

Figure 7:
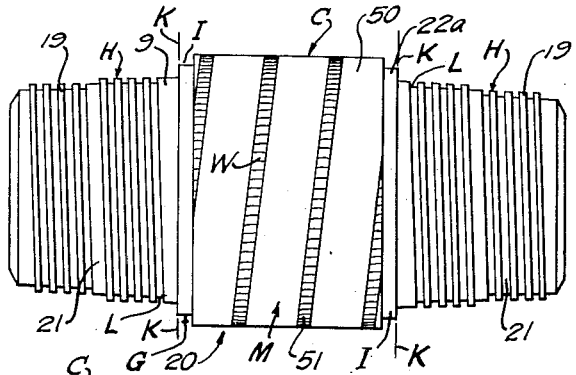
Fig. 7 illustrates a reconditioned tool joint.

Box 15 may be reconditioned in the manner just described in connection with box 14 or in any of the manners hereinafter described. Likewise the above description of reconditioning will apply to the application of wear-resistant strip 50 to the body portion 22a of tool joint 20. It will be noted in this connection that the line of weld 51 (Fig. 7) extends at an angle with respect to the normal fracture planes of tool joint (which planes are approximately at right angles to the axis of the joint, as has been said) and consequently that the lines of localized heating followed during the welding operation do not create a weakened zone coincident with those planes of fracture but on the contrary, the final disposition of weld W results in a line of strengthening material extending across those normal planes of fracture.

Fig. 8 shows a variational application of the sheath wherein, instead of truing up the entire upset of box 15, a groove 52, concentric with pipe portion 12, is turned in the outer face of the box, and strip 26 is coiled into this groove and, preferably, extended from end to end thereof. Or, if desired, the groove shoulder 53 may be eliminated by cutting away the box material along the dotted line 54, the cut-away upset portion 55 subsequently being replaced by a body of welding material. The sheathing is weld-integrated with the box as previously described.

In the examples given above, it has been assumed that the box and tool joint shoulders 22 and 24 have not been worn down to an extent which requires their reconditioning. In Figs. 9 to 12, inclusive, I have shown the preferable procedure when these shoulders need reconditioning, and have combined, in the showing of Fig. 9, the cure for another type of excessive joint wear.

In Fig. 9 it is assumed that the threaded connection between box 14 and pin end 21a is such that it cannot be restored to provide a suitable break-joint, while the pin end 21b can be restored to serve properly as a break-joint, though reconditioning of shoulder 24 is desirable. It is also to be assumed that reconditioning of shoulder 22 of box 15 is desirable.

After box 14 and body portion 22a of tool joint 20 have been externally trued in the manner set forth above, strip 26a is coiled about and weld-integrated with both box and tool joint, the strip extending across the outer ends of shoulders 22 and 24, thus permanently coupling box 14 and tool joint 20. Where the box wall is worn excessively thin, its weld material W may be caused to penetrate not only box 14 but to penetrate through the box and into the threads of pin 21a as at 30a, thus integrating a portion of that part of strip 26a which overlies box 14, with pin 21a as well as with the box.

Strip 26a extends to the right hand end of body portion 22a, and after the welding operation is completed, shoulder 24 is re-faced as at 59 while the end of strip 26a is co-extensively faced at 60 to provide, with re-facing 59, a full shoulder of substantially the same extent as that of the original shoulder. The threads and internal shoulder 25 on pin 21b may then be re-cut as indicated in dotted lines to associate them properly with re-faced shoulder 59, 60 thus restoring the entire pin end, in all effect, to its original condition.

In reconditioning box 15 in Fig. 11, the same steps are followed as have previously been described, except that strip 26b is extended approximately to shoulder 22. Thereafter shoulder 22 is re-faced as indicated by dotted line 59a in Fig. 11 and full line 59a in Fig. 12. The end of strip 26b is co-extensively faced at 61 to restore the end shoulder of the box approximately to its original condition, and then the box threads and internal shoulder may be re-cut as indicated in dotted lines to bring them into the same relationship to the re-faced shoulder 59a, 61 as they originally had with the original shoulder 22. The end of strip 26a may be chamfered or cut back as at 62 at the outer end of shoulder 60.

In Fig. 13 is shown a situation where the box threads and external shoulders are unduly worn and it is unfeasible to re-face or re-cut them. In such a situation, a breaking sub 63, having a pin end 64 and box end 65 corresponding to standard box and pin elements (or box 65 may have a different type of thread whereby it may be used for connection with tools having threads other than standard) is joined by spiraled strip 26b to box 14a and body portion 66 of sub 63 by weld-integration, in the same manner as that described in connection with the showing of Fig. 9. In the reconditioned joints shown both in Fig. 9 and Fig. 13, the welded sheath not only holds the box and pin elements together rigidly in spite of possible poor thread connections, but also forms a permanent fluid seal to prevent leakage between these members.

In Fig. 14 I have illustrated a method of protecting the box element of the joint by building up only the tool joint element, it following that the wear is taken on this built-up portion which protrudes radially to an extent that it holds the boxes clear of the surrounding casing or borewall. The protective build-up may be applied to joints before they have been run in a hole, or after such running. In Fig. 14, the joint is shown as though it had not yet been exposed to wear, with strip 26d weld-integrated with tool joint 20d in the manner described in connection with the description of Fig. 7. When strip 26d wears down, but before boxes 14e and 15d have been worn to any appreciable extent, the remaining portion of the strip may be cut from the tool joint and a new wear-resistant element applied to and integrated therewith, it thus being possible to maintain the box and tool joint combination in proper condition without the necessity of wrapping the box portions thereof.

In Figs. 15 to 19, inclusive, I have shown the building up of the body portion of one joint member in a manner to protect the box element of adjacent joint members or of threaded boxes provided in the built-up member, with the sheath performing the same function as that described in connection with Fig. 14, though it will be recognized that any of the illustrated sheaths may be utilized in reconditioning the box portions of the joints, just as has been described in connection with Figs. 5 and 8. Also, I have shown this build-up on a sub rather than on a double-ended tool joint, but it will be recognized that the same expedient may be used in connection with the tool joint previously described, or that the build-up of the sub may be accomplished in the same manner as that described in connection with the tool joint or boxes.

In Fig. 15 the tapered and reduced diameter pin 70 on sub 71 is taken within the complementary box 72 which is integral with pipe portion 73, while the opposite end of the sub is provided with a tapered box 74. The outer periphery 75 of the body portion 76 of the sub is flush with the outer periphery of upset box 77. Here, the wear resistant strips are in the form of bars 78, which are arranged in annular groove 69 and are parallel to the axis of the pipe but in circumferentially spaced relation, the welding material 79 being filled into the spaces between bars and integrating those bars both with one another and with body portion 76.

It will be recognized that the lines of weld in this case do not follow the normal planes of fracture, but instead cross them at substantially right angles, to the advantageous ends spoken of above. Of course it is not always essential to provide groove 69, for in some cases bars 78 may be applied directly to the outer periphery 75.

In Figs. 16, 17 and 18, is shown a variational embodiment of the invention wherein a sleeve 81 of wear-resistant material is substituted for the strip or bars of the previously described embodiments. In this case, however, there are provided spiral grooves, either continuous as at 82, or discontinuous as at 83, which are cut almost through the sleeve (Fig. 16). After the sleeve has been slipped endwise over sub 71 it is preferably, though not necessarily, tack welded at 84 or otherwise temporarily held in proper position (or it may be shrink-fitted) and then the bottoms of the grooves are penetrated by the hot welding material 85 as it is deposited, the welding material then penetrating into the sub (Fig. 17) it resulting that a solid sleeve is formed which is weld-integrated with the sub along spiral lines, thus giving all the advantageous final effects spoken of in connection with the spiral wrapping of Fig. 5.

Grooves 82 and 83 may be cut in any desired manner, though in Fig. 18 I have indicated a preferred formation for discontinuous grooves 83. Here the grooves are indicated as individual saw-cuts with straight bottoms 83a, leaving keystone zones 83b between their adjacent ends. The dot-dash lines indicate the depth of penetration of the weld-material when it is later applied in a manner to melt through the groove-bottoms and into the sub.

Figure 19:
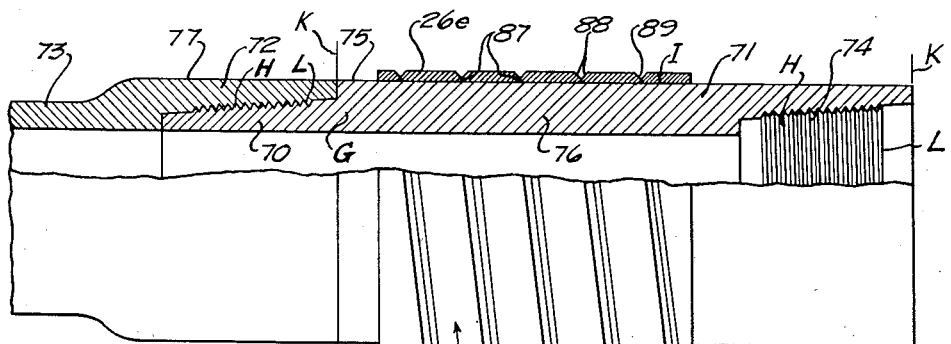
Figs. 19 and 20 show different steps in a variational method of applying a wear-resistant element to the tool joint in a manner to protect the adjacent box.
Figure 20:
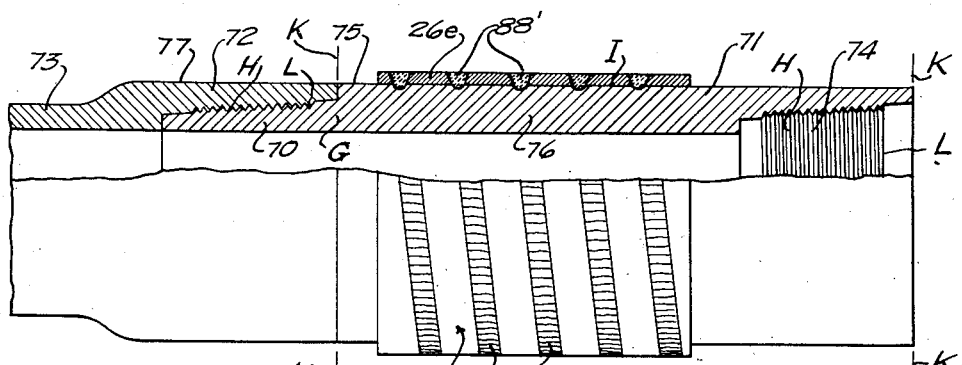

In Figs. 19 and 20 I have shown a variational embodiment wherein the wear-resistant strip 26e is applied in the same manner as strip 26 except that here the coils are in edge-to-edge engagement as at 87. Also, if desired, the strips may be chamfered as at 88 to provide a shallow groove 89 extending downwardly through a portion of their thickness, then, as described in connection with Fig. 17, when the weld material 88' is applied (Fig. 20) the coils at their abutting edges, are penetrated, weld material 88' subsequently penetrating the stock of sub 71, and thus weld-integrating the strip with the box and the coil convolutions with one another.

In order to establish certain common characteristics of all embodiments, I have employed certain common designations as follows:—in each case, the composite or built-up joint member comprises a tubular element G having one or two coupling threads H extending longitudinally inward from one or both ends of element G. Also, in each case, the tubular element G has an outer, unthreaded longitudinal extent I which is of greater diameter than the coupling threads H and starts in a plane K—K normal to the longitudinal axis of the element and located near one end L of one of the coupling threads. The sheathing M of wear resistant metal extends longitudinally of element G over the major portion of extent I, being weld-integrated to the element only at spaced locations. The sheathing M is of substantially uniform outside diameter throughout its longitudinal extent and represents the radially outermost projection of the joint.

While I have described preferred embodiments of my invention, it will be understood that various changes may be made without departing from the spirit and scope of the appended claims.

I claim:

1. In a break joint for well pipe, a built-in joint member embodying a tubular element having a coupling thread extending longitudinally inward from one end thereof and having an outer, unthreaded longitudinal extent which is of greater diameter than the thread and starts at a point in a plane normal to the longitudinal axis of the member and located near one end of said thread, and a sheathing of appreciable thickness and of wear-resistant metal about said extent only and weld-integrated with the element only at spaced locations, said sheathing extending longitudinally of said element over at least the major portion of said extent, said sheathing being of substantially uniform outside diameter throughout its longitudinal extent and representing the radially outermost projection of the member, said weld-integration interconnecting the element and sheathing to prevent separation thereof when they are subjected to high tensile and torsional loads.

2. In a break joint for well pipe, a built-up joint member embodying a tubular pin element having an external coupling thread extending longitudinally inward from one end thereof and having an outer, unthreaded longitudinal extent which is of greater diameter than the thread and starts at a point in a plane normal to the longitudinal axis of the member and located near the inner end of said thread, and a sheathing of appreciable thickness and of wear-resistant metal about said extent only and weld-integrated with the element only at spaced locations, said sheathing extending longitudinally of said element over at least the major portion of said extent, said sheathing being of substantially uniform outside diameter throughout its longitudinal extent and representing the radially outermost projection of the member, said weld-integration interconnecting the element and sheathing to prevent separation thereof when they are subjected to high tensile and torsional loads.

3. In a break joint for well pipe, a built-up joint member embodying a tubular box element having an internal coupling thread extending longitudinally inward from one end thereof and having an outer, unthreaded longitudinal extent which is of greater diameter than the thread and starts at a point in a plane normal to the longitudinal axis of the member and located near the outer end of said thread, and a sheathing of appreciable thickness and of wear-resistant metal about said extent only and weld-integrated with the element only at spaced locations, said sheathing extending longitudinally of said element over at least the major portion of said extent, said sheathing being of substantially uniform outside diameter throughout its longitudinal extent and representing the radially outermost projection of the member, said weld-integration interconnecting the element and sheathing to prevent separation thereof when they are subjected to high tensile and torsional loads.

4. In a break joint for well pipe, a built-up joint member embodying a tubular element having a coupling thread extending longitudinally inward from one end thereof and having an outer, unthreaded longitudinal extent which is of greater diameter than the thread and starts at a point in a plane normal to the longitudinal axis of the member and located near one end of said thread, said extent being annularly grooved with the groove extending longitudinally of said element throughout the major portion of said extent, and a sheathing of wear-resistant metal in said groove and extending from end to end thereof, the thickness of the sheathing being greater than the depth of the groove and the sheathing being weld-integrated to the element only at spaced locations, said sheathing being of substantially uniform outside diameter throughout its longitudinal extent and representing the radially outermost projection of the member, said weld-integration interconnecting the element and sheathing to prevent separation thereof when they are subjected to high tensile and torsional loads.

5. In a break joint for well pipe, a pair of joint members each embodying a tubular element having a coupling thread extending inwardly from one end thereof, the threads of the two elements having mating characteristics, one of said elements having an outer, unthreaded longitudinal extent which is of greater diameter than the associated thread and starts at a point in a plane normal to the longitudinal axis of the element and located near one end of its thread, and a sheathing of appreciable thickness and of wear-resistant metal about said extent and weld-integrated with said one element only at spaced locations, said sheathing extending longitudinally of said one element over the major portion of said extent, the sheathing being of substantially uniform outside diameter throughout its longitudinal extent and the outside diameter of the sheathing being greater than the outside diameter of the other joint member and the sheathing representing the radially outermost projection of the joint, said weld-integration rigidly interconnecting said one element and the sheathing and preventing relative separative movement therebetween when they are subjected to high tensile and torsional loads.

ALBERT L. STONE.

CERTIFICATE OF CORRECTION.

Patent No. 2,259,232.　　　　　　　　　　　　　　October 14, 1941.

ALBERT L. STONE.

It is hereby certified that error appears in the printed specification of the above numbered patent requiring correction as follows: Page 6, first column, line 18, claim 1, for "built-in" read --built-up--; and that the said Letters Patent should be read with this correction therein that the same may conform to the record of the case in the Patent Office.

Signed and sealed this 9th day of December, A. D. 1941.

Henry Van Arsdale,
Acting Commissioner of Patents.

(Seal)